United States Patent
So et al.

(10) Patent No.: US 7,111,127 B2
(45) Date of Patent: Sep. 19, 2006

(54) SYSTEM FOR SUPPORTING UNLIMITED CONSECUTIVE DATA STORES INTO A CACHE MEMORY

(75) Inventors: Kimming So, Palo Alto, CA (US); Chia-Cheng Choung, Fremont, CA (US); BaoBinh Truong, San Jose, CA (US); Yook-Khai Cheok, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 268 days.

(21) Appl. No.: 10/744,892

(22) Filed: Dec. 23, 2003

(65) Prior Publication Data

US 2005/0015552 A1    Jan. 20, 2005

Related U.S. Application Data

(60) Provisional application No. 60/486,980, filed on Jul. 14, 2003.

(51) Int. Cl.
   *G06F 12/08*   (2006.01)
(52) U.S. Cl. ...................................... 711/140
(58) Field of Classification Search ................ 711/118, 711/140
   See application file for complete search history.

(56) References Cited

U.S. PATENT DOCUMENTS

| | | | |
|---|---|---|---|
| 6,763,421 B1 * | 7/2004 | Luick | 711/3 |
| 2002/0108022 A1 * | 8/2002 | Chen | 711/140 |
| 2004/0103250 A1 * | 5/2004 | Alsup | 711/118 |

* cited by examiner

*Primary Examiner*—Hiep T. Nguyen
(74) *Attorney, Agent, or Firm*—McAndrews, Held & Malloy, Ltd.

(57) ABSTRACT

One or more methods and systems of improving the performance of consecutive data stores into a cache memory are presented. In one embodiment, the method comprises writing data into a data array associated with at least a first store instruction while accessing a tag in a tag array associated with at least a second store instruction. In one embodiment, the method of processing consecutive data stores into a cache memory comprises updating a first data in a cache memory while concurrently looking up or identifying a second data in the cache memory. In one embodiment, a system for improving the execution of data store instructions of a CPU comprises a pipelined buffer using a minimal number of data entries, a data array used for updating data associated with a first store instruction, and a tag array used for looking up data associated with a second store instruction.

19 Claims, 3 Drawing Sheets

SYSTEM FOR SUPPORTING UNLIMITED CONSECUTIVE DATA STORES INTO A CACHE MEMORY

RELATED APPLICATIONS/INCORPORATION BY REFERENCE

This application makes reference to and claims priority from U.S. Provisional Patent Application Ser. No. 60/486,980, entitled "Apparatus for Supporting Unlimited Consecutive Stores", filed on Jul. 14, 2003, the complete subject matter of which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Central processing units (CPUs) or control processors execute two types of instructions to access the memory. A load instruction fetches data from a memory location and puts it into CPUs registers, and a store instruction puts the data located in a register into memory. When data is stored in a cache memory, two steps are usually performed. Typically, these two steps incur a number of processor clock cycles when updating data in the cache memory. The first step involves looking up a tag within a tag array of the cache memory to see if the corresponding data is currently stored in the cache, while the second step involves writing new data (or updating data) into a data array (or cache line) of the cache that is identified by the tag. Unfortunately, the writing of new data into cache cannot be accomplished while a tag is being identified.

When performing multiple consecutive data stores, a conventional approach is to implement a storage buffer which holds a number of entries to be stored into a data array of the cache memory. If a data store instruction generates a hit of the cache memory, the data is put aside into the storage buffer, often termed a store buffer, in which the data is subsequently written into the data array. Often, the store buffer will become completely full, necessitating a removal of a data entry in the store buffer before a subsequent store instruction may be accommodated. For example, a store buffer may clear its buffer by writing one or more entries into the data array of a cache memory in order for it to accept additional data from new data store instructions. In this instance, the typical CPUs pipeline is not held up during a store instruction as long as there is an available store entry within the store buffer.

In many cases, however, a number of consecutive data store instructions may completely fill the store buffer. Should the next CPU cycle generate an instruction that is not a load or store instruction, any outstanding entries in the store buffer may be cleared by sequentially writing into the cache. Unfortunately, clearing the store buffer may require a number of CPU cycles to complete. As a consequence, the performance of a conventional pipelined processor may be significantly reduced when a number of consecutive data stores are performed.

There are other disadvantages when using a store buffer approach. The number of entries of the store buffer is usually limited to between 4 to 8 data entries in order to save space. In addition, store buffers with a large number of entries may take a longer time to access. Increasingly larger store buffers may hold more data; however, the benefit is at the expense of manufacturing cost. As a result of limiting the size of the store buffer to a size less than optimum, a number of additional "penalty" CPU cycles are needed to clear data from the buffer when the number of consecutive store instructions exceeds the capacity (e.g. number of entries) of the store buffer.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide for a method, system and/or apparatus to improve the execution of instructions by a central processing unit (CPU) or control processor. The method, system, and/or apparatus efficiently processes an unlimited number of consecutive stores into a data cache of the CPU.

In one embodiment, the method improves the execution of data store instructions of a CPU by writing data into a data array associated with at least a first store instruction while accessing a tag in a tag array associated with at least a second store instruction. In one embodiment, the data store instructions comprise an unlimited number of consecutive data store instructions. The aforementioned at least second store instruction is sequentially executed by the CPU after execution of the at least first store instruction. The method provides for previously mentioned writing and the accessing to be performed concurrently, and may be performed during the same CPU cycle, for example.

In one embodiment, the method of processing consecutive data stores into a cache memory comprises updating a first data in a cache memory while looking up (or identifying) a second data in the cache memory. In one embodiment, the looking up is performed by indexing a tag array of the cache memory. The first data is updated after the first data is identified in the cache memory. Thereafter, the updating is performed by way of an address entry and data entry provided by a buffer. In one embodiment, the buffer holds one, two, or three pairs of address/data entries.

In one embodiment, a system for improving the execution of data store instructions of a CPU comprises a buffer, a data array used for updating data associated with a first store instruction, and a tag array used for looking up or identifying data associated with a second store instruction. In yet another embodiment, the system further comprises a device for verifying a tag accessed in the tag array. In another embodiment, the system further comprises a first register for receiving a first address from the buffer, a second register for receiving a first data from the buffer, a third register for transmitting a second data to the buffer, and a fourth register for transmitting a second address used to index the tag array. In yet another embodiment, the system further comprises an address arbitration device for arbitrating the first address and a load address, a store arbitration device for selectively transmitting the second data and the second address, and a load arbitration device for selectively transmitting a load data to the CPU.

In one embodiment, the system for improving the execution of data store instructions of a CPU comprises a buffer, a data array, a tag array, a device for verifying a tag accessed in the tag array, a first register for receiving a first address from the buffer, a second register for receiving a first data from the buffer, a third register for transmitting a second data to the buffer, a fourth register for transmitting a second address used to index the tag array, and an address arbitration device for arbitrating the first address and a load address, a store arbitration device for selectively transmitting the second data and the second address, and a load arbitration device for selectively transmitting a load data to the CPU.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention may be found in a system and method to improve the execution of instructions generated by a control processor or central processing unit (CPU). The system and method maximizes performance of a CPU based system by way of improving processing throughput and/or speed of executing CPU instructions. The CPU instructions may comprise data store instructions related to updating a cache memory such as a data cache of a CPU. In one embodiment, the system and method facilitates more efficient processing of an unlimited number of consecutive data store instructions. In one embodiment, the number of steps or exemplary CPU cycles required to perform processing of one or more consecutive data stores is reduced. The system and method supports an unlimited number of consecutive data store instructions by way of using a simple buffer capable of storing address and data information associated with a minimal number of data store instructions. In one embodiment, the buffer stores address and data information corresponding to only two data store instructions (e.g., two entries). Aspects of the invention incorporate the use of a simple pipelined buffering scheme, in which data stores are completed for store hits as a new lookup is performed. As a result, aspects of the invention obviate the need to use a large number of buffer entries corresponding to the number of consecutive stores performed.

Figure 1:
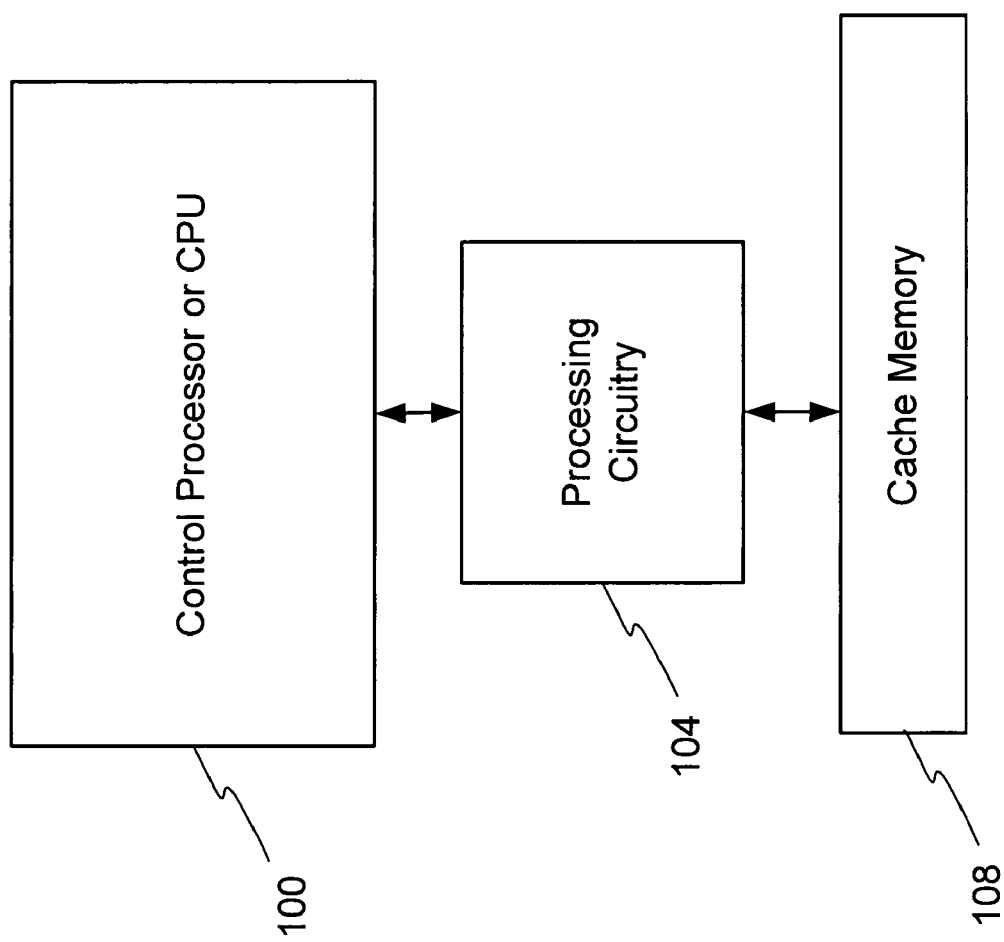
FIG. 1 illustrates a generalized block diagram including a processing circuitry or processing hardware that facilitates processing of the one or more consecutive data stores in accordance with an embodiment of the invention.

FIG. 1 illustrates a generalized block diagram including a processing circuitry or processing hardware 104 that facilitates processing of the one or more consecutive data stores in accordance with an embodiment of the invention. As shown, a central processing unit (CPU) or control processor 100 communicates with a cache memory 108 by way of a processing circuitry 104. The CPU 100 may transmit data and corresponding address information to the processing circuitry 104 based on one or more instructions executed by the CPU 100. The one or more executed instructions may comprise data store or data load instructions.

Figure 2:
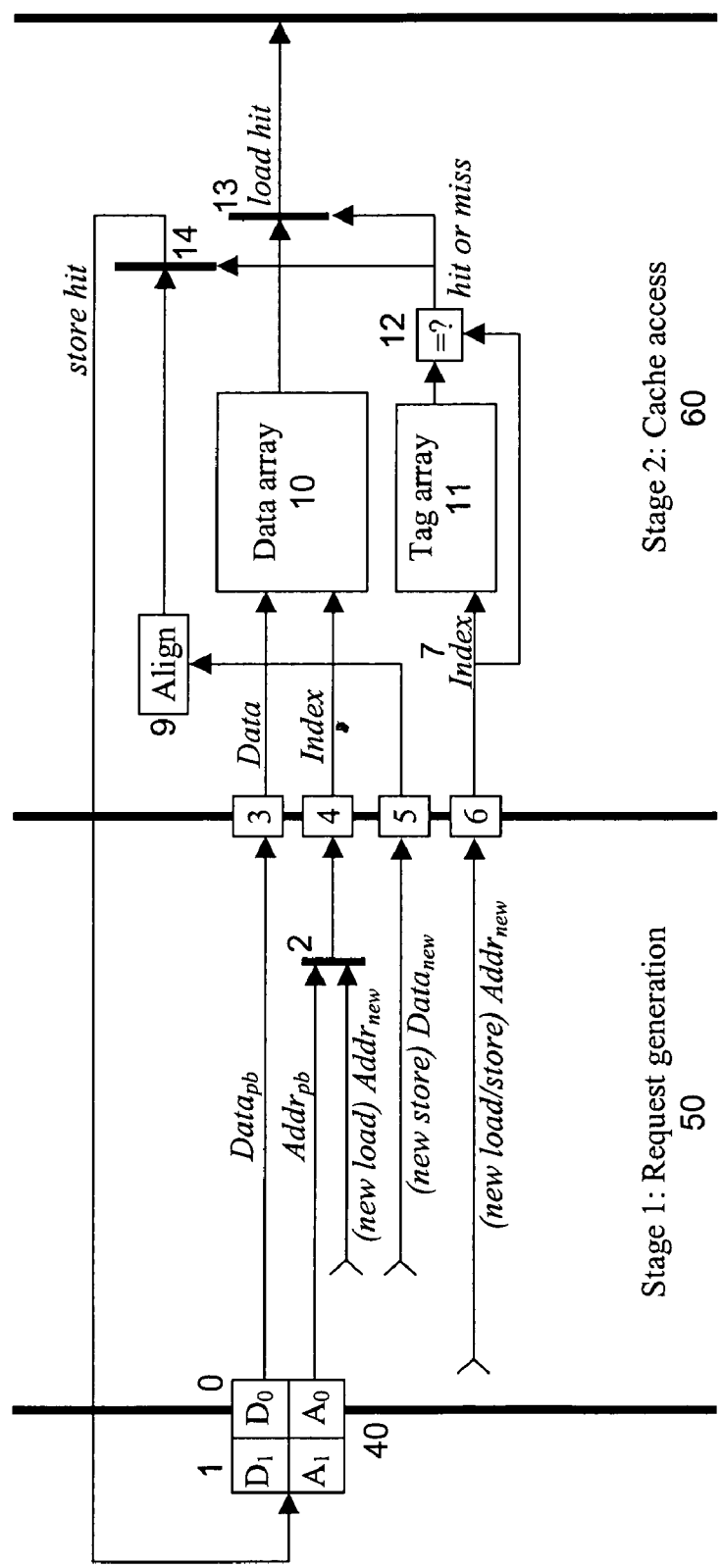
FIG. 2 is a detailed block diagram of a system that comprises a processing circuitry and a cache memory in accordance with various aspects of the invention.

FIG. 2 is a detailed block diagram of a system that comprises a processing circuitry and a cache memory, as was described in FIG. 1, in accordance with various aspects of the invention. The circuitry may be categorized into two stages—a request generation stage (first stage) 50 and a cache access stage (second stage) 60. These two stages, for example, may correspond to an execute stage and a memory access stage within a CPU pipeline. (An exemplary CPU pipeline may generally utilize a number of stages such as an instruction fetch stage, a decode stage, an execute or address generation stage, a memory access stage, and a write back to register stage.) The request generation stage 50 comprises a buffer 40 and an address arbitration device 2. As shown, the buffer 40 comprises two pairs of storage registers, each pair comprising an address register and a data register associated with a particular data store instruction. Each register pair is capable of holding a pair of entries—an address entry and a data entry, of which both are associated with a data store instruction. Although the buffer 40 comprises two pairs of storage registers in the embodiment illustrated in FIG. 2, it is contemplated that the number of registers employed in the buffer 40 may vary based on the circuit configuration of the first and second stages of the embodiment shown. In other embodiments, it is contemplated that the number of register pairs may comprise a single register pair or three register pairs. The number of register pairs may be influenced by how fast the CPU is able to process data or the processing time within a stage of the pipelined processor. As illustrated in FIG. 2, a new entry is shifted into the first register pair 1 while the entry previously located in the first register pair 1 is shifted into the second register pair 0. As indicated in FIG. 2, the data stored in the second register pair is termed $D_0$ while the data stored in the first register pair is termed $D_1$. Similarly, the address stored in the second register pair is termed $A_0$ while the address stored in the first register pair is termed $A_1$. The address arbitration device 2 may comprise a multiplexer that arbitrates between addresses provided by the address register of the second register pair 0 and a new address provided by the CPU. The address provided by the CPU may comprise a new load or a new store address.

The cache access stage 60 comprises a number of registers 3, 4, 5, 6 used to identify and update data, a block alignment device 9, a data array 10, a tag array 11, a comparator 12, a load arbitration device 13, and a store arbitration device 14. The registers 3, 4, 5, 6 comprise data registers 3, 5 and address registers 4, 6. One of the data registers 3, 5 comprises a data array data register 3 that receives the data, $D_0$, provided by the second register pair 0 of the buffer 40. The other data register 5 comprises a new data register 5 that receives data provided by the CPU in association with a new store instruction. One of the address registers 4, 6 comprises a data array address register 4 that receives the output of the address arbitration device 2. The data array address register 4 is used to index, for example: 1) an address used to index the data array 10 so that a write may be performed, or 2) a new load address in preparation for a possible read out of data from the data array 10. A tag array address register 6 is used to index, for example: 1) a new load address to identify a tag in the tag array 11 in preparation for a possible read of data from the data array 10, or 2) a new store address used in looking up or identifying a tag within the tag array 11. When a tag is indexed in a tag array 11, a comparator 12 is used to verify whether the indexed tag corresponds to the tag associated with the load or store address used to index the tag in the tag array 11. The comparator 12 may comprise any type of circuitry or device for verifying a tag accessed in the tag array 11. If the comparator 12 generates a cache hit, the corresponding load or store arbitration device 13, 14 is enabled for transmission, for example. If a particular tag address indexed in the tag array 11 results in a cache hit during a data load instruction, for example, the corresponding data is accessed in the data array 10 and transmitted to the CPU by way of the load arbitration device 13. The comparator 12 may be any circuitry capable of verifying the existence of a particular tag within a tag array of a cache by way of a tag address.

On the other hand, if a particular tag address indexed in the tag array 11 results in a cache hit during execution of a data store instruction, for example, the corresponding data is transmitted from the new data register 5 to the store arbitration device 14 by way of the block alignment device 9. In addition, the corresponding tag address may be provided to the input of the store arbitration device 14 by the comparator 12, such that the data and its tag address may be provided to the buffer 40. The block alignment device 9 is used to align data when the data to be stored in the data array 10 comprises a subset of the number of bits typically used in a word or double word (i.e., depending if the CPU utilizes a 32 bit or 64 bit architecture, given that a word is 32 bits long) of data stored in the data array 10. The output of the store arbitration device 14 is transmitted to the input of the buffer 40 where the first register pair 1 stores the data and address entries to be used in accessing the tag array 11 and updating the data array 10. If the first register pair 1 had previously contained an address and its corresponding data entries, these entries are shifted over or transferred over to the second register pair 0, in preparation for transmission to its appropriate data array data register 3 and data array address register 4. It is contemplated that the arbitration devices 2, 13, 14 may comprise one or more input multiplexers capable of being selectively enabled.

Aspects of the present invention provide a method and system to write into the data array 10 while looking up a tag in the tag array 11. For example, the method and system allows writing data into a data array associated with at least a first instruction while accessing a tag in a tag array associated with at least a second store instruction. The relational block diagram of FIG. 2 illustrates an embodiment in which the data array 10 is accessed independently of the tag array 11 by way of separate addresses. The data array address register 4 is used to address the data array 10 while the tag array address register 6 is used to address the tag array 11. Data may be written into the data array 10 while a cache line is identified by way of the tag array 11. This, of course, may be performed simultaneously during the same CPU cycle. As a result, the method and system described yields improved system performance. For example, the following exemplary CPU cycles illustrates the operation of the embodiment of FIG. 2:

Let us consider the sequence of store instructions is given by . . . ST3, ST2, ST1, ST0 . . . , where ST0 is the earliest store instruction of the four store instructions. The following example assumes that all store instructions result in hits (cache hits) when a tag address is accessed from the tag array 11 as was described in FIG. 2:

cycle i−1: $Addr_{new}$ and $Data_{new}$ of ST0 enters Stage 1 (Request Generation stage)

cycle i: $Addr_{new}$ and $Data_{new}$ of ST0 looks up the tag array 11 (corresponding to the ST0 store instruction) and a hit facilitates storage of $Addr_{new}$ and $Data_{new}$ of ST0 into buffer 40, $Addr_{new}$ and $Data_{new}$ of ST1 enters Stage 1 and an arbitration occurs at the input of address arbitration device 2 with any outstanding request. (In this instance, there is no load instruction or output provided by the buffer 40, so $Addr_{new}$ and $Data_{new}$ of ST1 is transmitted to tag array address register 6 and data array address register 5)

cycle i+1: $Addr_{new}$ and $Data_{new}$ of ST1 looks up the tag array 11 and a hit facilitates storage of $Addr_{new}$ and $Data_{new}$ of ST1 into buffer 40; $Addr_{new}$ and $Data_{new}$ of ST2 enters Stage 1 and an arbitration occurs between the input of any new load request and the $Addr_{new}$ of ST0. Since there is no new load request in this cycle, the data and address index are stored in data array data register 3 and data array address register 4, respectively.

cycle i+2: $Data_{new}$ of ST0 is written in the data array 10, ST2 looks up the tag array 11 and a hit facilitates storage of $Addr_{new}$ and $Data_{new}$ of ST2 into buffer 40; ST3 enters Stage 1 and an arbitration occurs between an input of any new load request and the $Addr_{new}$ of ST1.

The above mentioned sequence of store instructions illustrates that aspects of the present invention allow for processing of an infinite number of consecutive store requests without negatively affecting the performance of the CPU. For example, the CPU is not interrupted or stalled or slowed down. In addition aspects of the invention obviate the need for a large store buffer (containing a large number of entries) because of the pipelined processing that is used.

Similarly, let us consider the sequence of load/store instructions represented by . . . , X, LD0, ST1, ST0, . . . where X can be any instruction and ST0 is the earliest instruction of the four instructions. LD0 is considered to be a load instruction. When LD0 shows up in Stage 1 as a new instruction, both ST0 and ST1 are held in the buffer 40. If X is a load instruction, then in the next cycle, X will access the cache by way of the tag array 11, but the addresses and data corresponding to instructions ST0 and ST1 are held at the buffer 40; otherwise if X is not a load instruction, in the next cycle, the address of ST0 will be able to update (or write data into) the data array 10 at the same time X enters Stage 1.

The embodiment of FIG. 2 is capable of efficiently supporting consecutive store instructions provided by a CPU. In fact, the embodiment is capable of completing an unlimited number of consecutive data stores into a cache memory, without any risk of saturating the buffer 40 described. Because the cache memory is accessed more effectively, the overall processing performance is improved. It is contemplated that the circuitry described in the embodiment of FIG. 2 may be implemented on a cache memory that resides either on or off a CPU chip. The circuitry may be implemented for any type of cache memory, such as level 1, level 2, . . . , level n cache memory.

Figure 3:
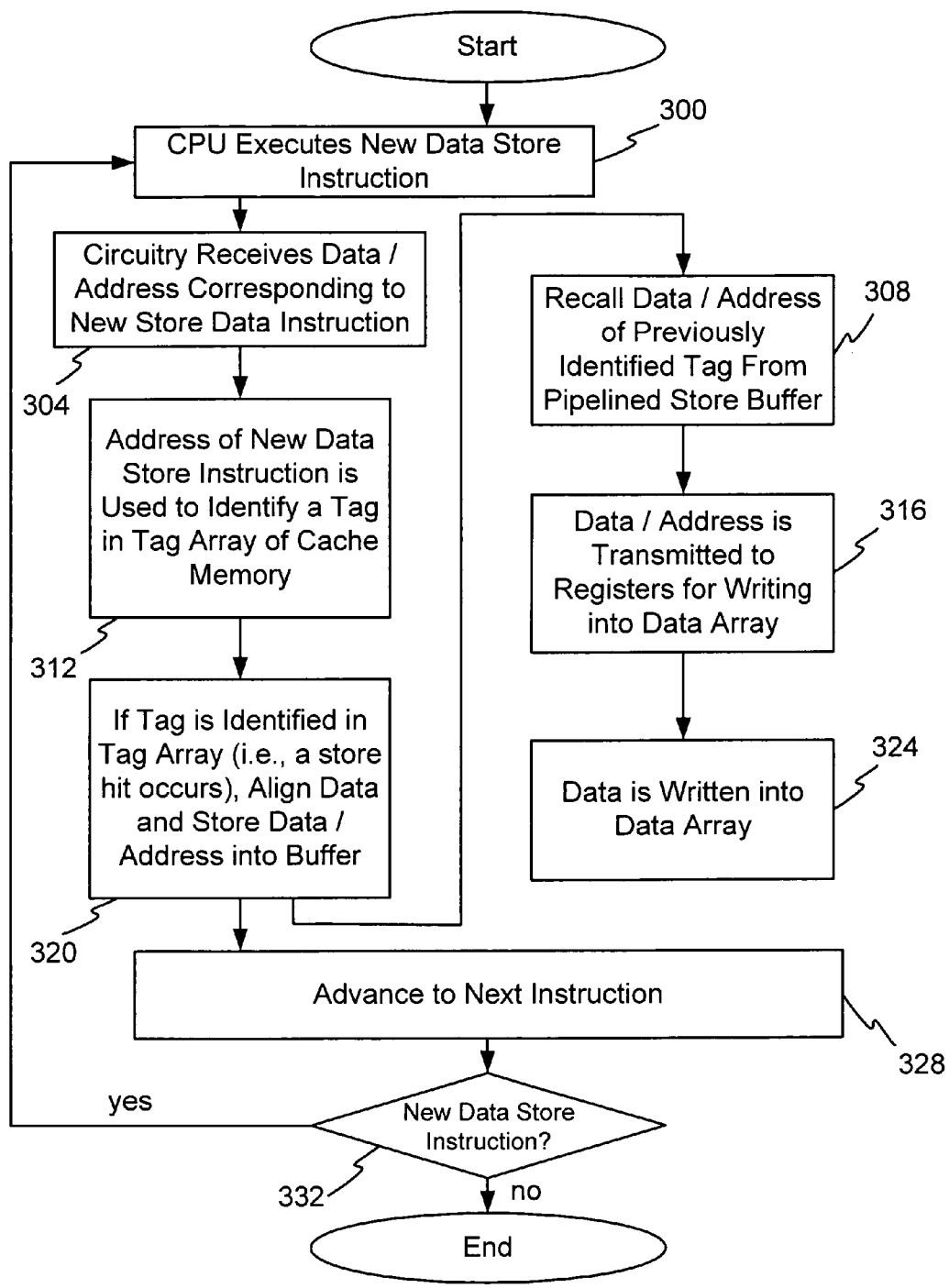
FIG. 3 illustrates an operational flow diagram of a method by which a control processor or CPU performs a data store into a cache memory in accordance with an embodiment of the invention.

FIG. 3 illustrates an operational flow diagram of a method by which a control processor or CPU performs a data store into a cache memory in accordance with an embodiment of the invention. At step 300, the CPU executes a new data store instruction. Next, the process proceeds to steps 304 and 308. At step 304, the associated data and address corresponding to the new data store instruction is received by a processing circuitry (such as the processing circuitry described in FIGS. 1 and 2). In parallel, at step 308, a data/address pair from a previously encountered store instruction is recalled from a buffer (such as the buffer previously described in FIG. 2) in order to access a data array of the cache memory. The tag of the data/address pair of step 308 was previously identified in the tag array of the memory cache, resulting in a cache hit. Next, at step 312, the address of the new data store instruction is used to identify a tag in a tag array of the cache memory. In parallel, at step 316, the recalled data/address pair is transmitted to a data register (such as the data array data register previously described in FIG. 2) and an address register (such as the data array address register previously described in FIG. 2), in preparation for writing the data held by the data register into the data array of the cache memory. Next, the process proceeds to steps 320 and 324. At step 320, if a tag in the tag array is identified (indicating a cache hit), the corresponding data is aligned (by way of an exemplary block alignment device previously described in FIG. 2) and the data/address pair is transmitted to the buffer for writing into the data array in a subsequent step. At step 324, the data stored in the exemplary data array register is written into the data array using the address in the exemplary data array address register. At step 328, the process advances to the next instruction while again at step 308, the identified tag address is recalled from the buffer in order to access the data array of the cache memory. At step 332, if the next instruction corresponds to a new data store instruction, the process jumps back to step 300. Otherwise, execution of one or more other types of instructions commences until the store process resumes, by way of entering step 300. The one or more other types of instructions may comprise, for example, a data load instruction. In summary, the embodiment described provides an exemplary method of accessing the data array and the tag array concurrently, thereby maximizing the processing power of the CPU.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of improving the execution of data store instructions of a control processor comprising:
    writing data into a data array associated with a first store instruction; and
    accessing a tag in a tag array associated with a second store instruction while performing said writing data of said first store instruction into said data array, said second store instruction executed consecutively after execution of said first store instruction, said writing performed by using an address provided by a buffer to a first arbitration device, said first arbitration device transmitting said address to index said data array, said second store instruction using a second arbitration device to store a data and an address associated with said second store instruction into a pair of registers of said buffer when a cache hit occurs.

2. The method of claim 1 wherein said writing data occurs subsequent to said cache hit, said cache hit resulting from positively identifying its associated tag in said tag array.

3. The method of claim 1 wherein said writing and said accessing is performed for an unlimited number of consecutive store instructions without negatively affecting performance of said control processor.

4. The method of claim 1 wherein said writing and said accessing are performed concurrently.

5. The method of claim 1 wherein said writing and said accessing are performed in the same control processor cycle.

6. A method of efficiently processing consecutive data stores into a cache memory comprising:
    updating a first data in a cache memory; and
    identifying a second data in said cache memory while performing said updating of said first data, said cache memory comprising:
        a data array used for storing said first data and said second data;
        a tag array used for identifying data within said cache memory; and
        an address arbitration device used for arbitrating an address used for:
            a) accessing data from said data array when said updating said first data occurs, or
            b) accessing data from said data array when a read is performed.

7. The method of claim 6 wherein said updating a first data is performed after said first data is identified in said cache memory.

8. The method of claim 6 wherein said updating is performed by way of an address entry and data entry provided by a buffer.

9. The method of claim 8 wherein said buffer comprises a storage for one, two, or three pairs of address/data entries.

10. The method of claim 6 wherein said identifying is performed by indexing said tag array.

11. The method of claim 6 wherein said cache memory comprises any level of cache memory in a control processor.

12. A system for improving the execution of data store instructions of a control processor comprising:
    a buffer capable of storing address and data information associated with a number of data store instructions, said buffer comprising two or more pairs of storage registers, each pair of said two or more pairs comprising an address register and a data register;
    a store arbitration device;
    a data array used for updating data associated with a first store instruction; and
    a tag array used for identifying data associated with a second store instruction while performing said updating data into said data array, said tag array used for indexing a tag using an address associated with said second store instruction, said address provided to said store arbitration device, said address received by said buffer by transmitting from said store arbitration device when a cache hit of said second store instruction occurs.

13. The system of claim 12 further comprising a block alignment device that is used to align data when said data updated in said data array comprises a subset of a number of bits typically used.

14. The system of claim 12 further comprising a comparator for verifying said tag accessed in said tag array.

15. The system of claim 14 further comprising:
    a first address register of said two or more pairs of storage registers for receiving a first address from said buffer;
    a first data register of said two or more pairs of storage registers for receiving a first data from said buffer;
    a second data register of said two or more pairs of storage registers for transmitting a second data to said buffer; and
    a second address register of said two or more pairs of storage registers for transmitting said address used to index said tag array.

16. The system of claim 15 further comprising:
    an address arbitration device for arbitrating said first address and a load address; and a load arbitration device for selectively transmitting a load data to said control processor.

17. A system for improving the execution of data store instructions of a control processor comprising:
a buffer;
a data array;
a tag array;
a device for verifying a tag accessed in said tag array;
a first register for receiving a first address from said buffer;
a second register for receiving a first data from said buffer;
a third register for transmitting a second data to said buffer;
a fourth register for transmitting a second address used to index said tag array;
an address arbitration device for arbitrating said first address and a load address;
a store arbitration device for selectively transmitting said second data and said second address; and
a load arbitration device for selectively transmitting a load data to said control processor.

18. A system for performing consecutive store operations on a cache memory comprising:
a buffer comprising a first data/address register pair and a second data/address register pair;
a data array used for storing data;
a tag array used for identifying said data stored in said data array;
a comparator used for determining a cache hit given an address in said tag array; and
a first arbitration device used for transmitting a first data and a first address of a first store instruction to said first data/address register pair in said buffer, said transmitting performed when said cache hit occurs;
a second arbitration device used for receiving a second address provided by said second data/address register pair;
a first register for receiving said second address from said second arbitration device, said first register communicatively coupled to said second arbitration device;
a second register for receiving a second data from said second data/address register pair, said second register communicatively coupled to said second data/address register pair;
a third register for receiving and transmitting a third data, said third register communicatively coupled to said first arbitration device by way of a data alignment device; and
a fourth register for receiving and transmitting a third address, said fourth register communicatively coupled to said tag array.

19. The system of claim 18 wherein said data alignment device is used to align data when said data stored in said data array comprises a subset of a number of bits typically used.

* * * * *